UNITED STATES PATENT OFFICE.

PETER HAUPTMANN, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

AZO DYE.

1,074,946.  Specification of Letters Patent.  Patented Oct. 7, 1913.

No Drawing.  Application filed April 30, 1912.  Serial No. 694,255.

*To all whom it may concern:*

Be it known that I, PETER HAUPTMANN, doctor of philosophy, chemist, citizen of the German Empire, residing at Leverkusen, near Cologne, Germany, have invented new and useful Improvements in Azo Dye, of which the following is a specification.

Basic azo dyestuffs prepared from 1.3-dioxyquinolin have not heretofore been described and used. I have discovered that a new class of basic azo dyestuffs can be obtained from dioxyquinolin which dyestuffs contain this compound as end component. These new dyestuffs are distinguished by the valuable property of being capable of dyeing artificial silk (Chardonnet-silk, glanzstoff), etc., from red to brown shades fast to water and to light.

The new process for the manufacture of these dyestuffs consists in combining the diazo compounds of aminobenzylamins, aminobenzylpyridins or aromatic ammonium bases with an aromatic amin, diazotizing these intermediate products and finally combining the diazoazo compounds thus produced with 2.4-dioxyquinolin.

The new dyestuffs of the present invention are, when the above specified starting materials are employed, disazo dyestuffs, and have the following general formula:

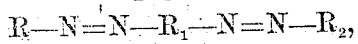

where R is the radical of the diazotized aromatic base (benzylamins, pyridins, etc.) and $R_1$ the aromatic radical of the aromatic amin used as middle component and with which, after diazotization, the dioxyquinolin is coupled, and $R_2$ the radical of 2.4-dioxyquinolin as end component.

In order to illustrate the new process more fully, the following example is given, the parts being by weight:—

Example: 17 parts of the zinc double salt of para-aminobenzylpyridin are dissolved in 200 parts of water cooled with ice and diazotized with 5 parts of HCl (19° Bé.) and 2.5 parts of nitrite. The diazo solution is added about 5° to a solution of 6.5 parts of cresidinhydrochlorid in 100 parts of water. After 12 hours the free acid is neutralized with 7 parts of sodium acetate and the mixture is after 12 hours acidulated with 10 parts of hydrochloric acid (19° Bé.). The monoazo dyestuff is then stirred up with 300 parts of water of 50°–60° C., cooled with ice to 10° C. and diazotized with 2.4 parts of sodium nitrite and 10 parts of HCl (19° Bé.). Subsequently 6.1 parts of 2.4-dioxyquinolin are dissolved in 250 parts of water and 4 parts of NaOH (40 per cent.). After the addition of 5 parts of sodium carbonate the diazo compound is added thereto at about 5° C. The dyestuff is filtered off and dried. It dyes artificial silk in red shades. It has the following graphically represented formula:

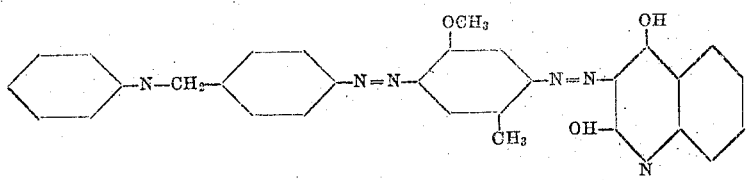

Instead of cresidin, xylidin, meta-toluidin, meta-aminophenol, 1-naphthylamin, etc., can be used.

The term aromatic base is used herein to indicate the bases, the amino derivatives of which (amino-benzyl-pyridin, etc.) are diazotized and used as starting materials for forming the azo dyestuffs.

The dyes are after being dried and pulverized red to brown powders yielding upon treatment with stannous chlorid and hydrochloric acid aminodioxyquinolin.

I claim:—

1. As new products, basic disazo dyestuffs containing 2.4-dioxyquinolin as end component, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

2. As new products, basic disazo dyestuffs containing 2.4-dioxyquinolin as one end component, and the radical of an aromatic base as the other end component, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

3. As new products, basic disazo dyestuffs containing 2.4-dioxyquinolin as one end component, and the radical of benzylpyridin as the other end component, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

4. As new products, basic disazo dyestuffs containing 2.4-dioxyquinolin as one end component, and the radical of benzylpyridin as the other end component, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

5. As a new product the basic azo dyestuffs containing 2.4-dioxyquinolin as end component, and having the following general formula:

"$R-N=N-R_1-N=N-R_2$,"

where R is the radical of an aromatic base, $R_1$ an aromatic nucleus of the benzene series, and $R_2$ the radical of 2.4-dioxyquinolin, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

6. As a new product, the basic azo dyestuffs containing 2.4-dioxyquinolin as end component, and having the following general formula:

"$R-N=N-R_1-N=N-R_2$,"

where R is the radical of benzyl pyridin, $R_1$ an aromatic nucleus, and $R_2$ the radical of 2.4-dioxyquinolin, which dyestuffs after being dried and pulverized are from red to brown powders, yielding upon reduction with stannous chlorid and hydrochloric acid aminodioxyquinolin and dyeing artificial silk directly red to brown shades fast to water and to light, substantially as described.

In testimony whereof I have hereunto set my hand in the presence of two subscribing witnesses.

PETER HAUPTMANN. [L. S.]

Witnesses:
HELEN NUFER,
ALBERT NUFER.